(12) United States Patent
Kock et al.

(10) Patent No.: US 8,895,659 B2
(45) Date of Patent: Nov. 25, 2014

(54) POLYPROPYLENE HOMOPOLYMERS WITH HIGH HEAT DEFLECTION TEMPERATURE, HIGH STIFFNESS AND FLOWABILITY

(75) Inventors: Cornelia Kock, Pucking (AT); Petar Doshev, Linz (AT)

(73) Assignee: Borealis AG, Porvoo (FI)

( * ) Notice: Subject to any disclaimer, the term of this patent is extended or adjusted under 35 U.S.C. 154(b) by 0 days.

(21) Appl. No.: 13/982,938

(22) PCT Filed: Oct. 24, 2011

(86) PCT No.: PCT/EP2011/005368
§ 371 (c)(1),
(2), (4) Date: Sep. 5, 2013

(87) PCT Pub. No.: WO2012/143023
PCT Pub. Date: Oct. 26, 2012

(65) Prior Publication Data
US 2014/0031480 A1    Jan. 30, 2014

(30) Foreign Application Priority Data

Apr. 21, 2011 (EP) .................................... 11003388

(51) Int. Cl.
| C08L 23/12 | (2006.01) |
| C08K 3/34 | (2006.01) |
| C08F 10/06 | (2006.01) |
| C08F 110/06 | (2006.01) |
| C08K 7/06 | (2006.01) |
| C08K 7/14 | (2006.01) |

(52) U.S. Cl.
CPC . *C08K 3/34* (2013.01); *C08F 10/06* (2013.01); *C08F 110/06* (2013.01); *C08L 23/12* (2013.01); *C08K 7/06* (2013.01); *C08K 7/14* (2013.01)

USPC ........................................... 524/582; 524/451

(58) Field of Classification Search
USPC ........................................................ 524/582
See application file for complete search history.

(56) References Cited

U.S. PATENT DOCUMENTS

| 6,503,993 B1 * | 1/2003 | Huovinen et al. ........... 526/348.1 |
| 2004/0116629 A1 | 6/2004 | Blackmon et al. |

FOREIGN PATENT DOCUMENTS

| EP | 0 491 566 | 6/1992 |
| EP | 2 174 980 | 4/2010 |
| WO | WO 87/07620 | 12/1987 |
| WO | WO 92/19653 | 11/1992 |
| WO | WO 92/19658 | 11/1992 |
| WO | WO 99/24478 | 5/1999 |
| WO | WO 99/24479 | 5/1999 |
| WO | WO 00/68315 | 11/2000 |
| WO | WO 2011/000557 | 1/2011 |

OTHER PUBLICATIONS

International Preliminary Report on Patentability issued Oct. 22, 2013 for International Application No. PCT/EP2011/005368.
International Search Report mailed Nov. 22, 2011 for International Application No. PCT/EP2011/005368.
Written Opinion mailed Nov. 22, 2011 for International Application No. PCT/EP2011/005368.

* cited by examiner

*Primary Examiner* — Hui Chin
(74) *Attorney, Agent, or Firm* — Fay Sharpe LLP

(57) ABSTRACT

The invention relates to a polypropylene composition showing a high melt flow rate and simultaneously high stiffness and a process for the production thereof. The invention further relates to a material comprising the inventive polypropylene.

15 Claims, No Drawings

POLYPROPYLENE HOMOPOLYMERS WITH HIGH HEAT DEFLECTION TEMPERATURE, HIGH STIFFNESS AND FLOWABILITY

The present invention relates to polypropylene compositions with very high melt flow rate and a process for producing the same. The present invention is further concerned with materials comprising polypropylene compositions of very high melt flow rate and use of such very high melt flow rate polypropylene compositions.

BACKGROUND

The need for polyproyplene homopolymers with excellent stiffness at high flowability is constantly increasing as down-gauging and light-weighing become more important with the need for saving energy resources. High flowability polypropylenes are typically used in moulding and particularly the automotive business where injection moulding is the preferred conversion-process. Especially for glass fibre applications high flow homopolymer with good mechanical properties and high thermal stability is required.

The production of ultra high MFR polypropylene homopolymers may be achieved by controlling the reaction conditions such that a fraction of molecules having relatively short chains is obtained. However, increasing the fraction of molecules having relatively short chains is detrimental to impact strength. Another problem makes a solution even more complex. Higher stiffness of polypropylene is conventionally accompanied by higher shrinkage. Shrinkage, being a measure for three-dimensional stability in moulding, is related with the applicability for moulding applications.

From a process perspective, the provision of polypropylene having a high flowability and simultaneously high stiffness is challenging. Increasing the hydrogen concentration in the polymerization reactor can result in considerably high amount of amorphous material limiting crystallinity and insofar stiffness. A known concept of overcoming these limitations is the use of external donors. External donors increase the hydrogen response and can significantly increase the production rate to crystalline material. However, donors resulting in a better hydrogen response yield materials with lower isotacticity, and insofar lower stiffness.

From a general perspective, stiffness is mainly influenced by the crystal structure which is mainly influenced by chain regularity and further by molecular weight. The crystal structure is inter alia reflected by the lamella thickness being directly measurable by stepwise isothermal segregation technique (SIST). Stepwise isothermal segregation technique (SIST) is a stepwise fractioning by crystallization when cooling the molten sample.

Heterophasic polypropylenes having a matrix phase and a dispersed rubber phase also have stiffness values far below the desired range originating from the dispersed phase. EP 2174980 discloses such materials produced by a triple reactor cascade.

Similar limitations as to stiffness also hold for bimodal polypropylene random copolymers such as disclosed in WO2011/000557.

US 2004/0116629 discloses an ultra high melt flow polypropylene resin obtained by either an internal diether based donor such as Mitsui RK-100 and Mitsui RH-200 or an external donor such cyclohexylmethyl dimethoxysilane (CMDS), dicyclopentyl dimethoxysilane (CPDS), diisopropyl dimethoxysilane (DIDS), cyclohexylisopropyl dimethoxysilane (CIDS), and di-t-butyl dimethoxysilane (DTDS). Though the obtained polypropylenes have relatively high crystallinity, the mechanical properties still need to be improved.

Thus, there is still the need for a polypropylene having high stiffness at a given very high melt flow rate and additionally acceptable good shrinkage values.

SUMMARY OF THE INVENTION

The present invention is based on the surprising finding that these objects can be achieved when the amount of lamellas having a thickness within a range of 24.2 to 84.6 nm is above 40% in a SIST measurement. The present invention is further based on the surprising finding that the negative side effects of the use of external donors yielding higher hydrogen response can be overcome by incorporating a relatively high amount of high molecular weight material having a comparatively moderate molecular weight. In yet another aspect, it has been surprisingly found that the limitations of conventional ultra high melt flow polypropylene compositions can be overcome when the high molecular weight fraction is present in a relatively high amount but has a relatively moderate molecular weight.

The present invention insofar provides
a polypropylene composition comprising a polypropylene base resin, the polypropylene base resin having
lamellas of a thickness from 24.2 nm to 84.6 nm in an amount of at least 40% when measured by stepwise isothermal segregation technique (SIST); and
a molecular weight distribution broadness Mw/Mn, as calculated from gel permeation chromatography, of at least 5, and the polypropylene composition having an $MFR_2$ measured according to ISO 1133 (230° C., 2.16 kg load) of at least 50 g/10 min;
and a tensile modulus of 2000 MPa or higher when measured according to ISO 527-2 using injection moulded test specimens as described in EN ISO 1873-2 (dog bone shape, 4 mm thickness).

The present invention further provides a polypropylene composition
having a tensile modulus of 2000 MPa or higher when measured according to ISO 527-2 using injection moulded test specimens as described in EN ISO 1873-2 (dog bone shape, 4 mm thickness)
obtainable by a process comprising,
polymerizing propylene in the presence of a catalyst system including a Ziegler Natta catalyst and either diethylaminomethyl triethoxysilane (donor U)

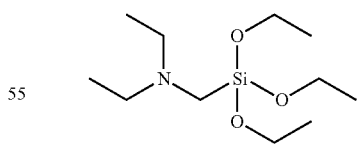

or dicyclopentanedimethoxysilane (DCPDMS, donor D) as an external donor, the mole ratio of Al/external donor being in the range of 0.5 to 50
whereby,
(i) a first intermediate polypropylene with an $MFR_2$ in the range of 200 to 2000 g/10 min (ISO 1133; 230° C., 2.16 kg load) is formed in a first reaction zone;
(ii) the first intermediate polypropylene is further polymerized in a second reaction zone to form a second intermediate polypropylene having an MFR$_2$ in the range of 80 to 800 g/10 min (ISO 1133; 230° C., 2.16 kg load);

(iii) the second intermediate polypropylene is further polymerized in a third reaction zone to form the third intermediate polypropylene having an MFR$_2$ in the range of 50 to 300 g/10 min (ISO 1133; 230° C., 2.16 kg load);

and optionally compounding the third intermediate polypropylene to form the polypropylene composition having an MFR$_2$ in the range of 50 to 300 g/10 min (ISO 1133; 230° C., 2.16 kg load).

In yet another aspect, the present invention provides a material comprising the polypropylene composition according to the present invention and a filler.

The present invention is further concerned with the use of the inventive polypropylene composition for increasing the temperature resistance.

DEFINITIONS

Polypropylene composition denotes a composition consisting of at least 98.0 wt.-% polypropylene base resin and up to 2.0 wt.-% additives. Preferably the additives are selected from antioxidants, acid scavengers, UV stabilizers, α-nucleating agents, slip agents, antistatic agents and combinations thereof.

Polyproyplene base resin denotes all polypropylenes in the polypropylene compositions.

The amount of a certain lamella thickness range in percent is the relative percentage of the lamella thicknesses within this range with respect to all lamella thicknesses within the sample.

Catalyst system denotes the combination of the catalyst and the co-catalyst.

Reaction zone is a locally delimited zone where the reaction takes place. Usually each reaction zone will be formed by one reactor.

Increasing the temperature resistance shall mean an increase as to the temperature resistance either over a base material or, when the inventive polypropylene composition substitutes another composition.

DETAILED DESCRIPTION

It has been surprisingly found that a relatively high amount of above 40% of lamellas having a thickness within a range of 24.2 to 84.6 nm with respect to the whole lamella thickness range, as obtained in a SIST measurement is advantageous as to several aspects.

In a SIST measurement the melt enthalpy is recorded as function of temperature and evaluated through measuring the melt enthalpy of fractions melting within temperature intervals of 10° C. in the range from 50 to 200° C. The melting curve of the polypropylene crystallized this way is used for calculating the lamella thickness distribution according to the Thomson-Gibbs equation. Details are given in the experimental part.

An amount of above 40% with respect to lamella thickness within a range of 24.2 to 84.6 nm allows polypropylene compositions having an excellent balance of properties. In a first aspect, flowability such as reflected by melt flow rate, is very high. The significantly better flowability enables the use of the polypropylene compositions in moulding applications, particularly injection moulding applications.

The excellent flowability is further accompanied by high stiffness. High stiffness is important for numerous polypropylene uses.

Preferably the polypropylene base resin according to the present invention has an amount of above 45% of lamella thicknesses within a range of 24.2 to 84.6 nm with respect to the whole lamella thickness range, as obtained in a SIST measurement.

Further preferably the polypropylene base resin according to the present invention has an amount of below 35% of lamella thicknesses within a range of 14.09 to 24.16 nm with respect to the whole lamella thickness range, as obtained in a SIST measurement.

The polypropylene composition according to the present invention preferably has an MFR$_2$ measured according to ISO 1133 (230° C., 2.16 kg load) of at least 60 g/10 min, more preferably at least 69 g/10 min, most preferably more than 125 g/10 min. The upper MFR$_2$ will usually be lower than or equal to 300 g/10 min and more conventionally lower than or equal to 280 g/10 min.

The polypropylene base resin according to the present invention preferably has a melting temperature of at least 162° C., more preferably at least 164° C. and most preferably at least 165° C. all melting temperatures being measured by DSC analysis.

The polypropylene base resin according to the present invention preferably has an xylene soluble content XS (23° C., ISO 6427) of 2.5 wt.-% or lower, more preferably 2.2 wt.-% or lower and most preferably 2.1 wt.-% or lower.

The polypropylene base resin according to the present invention is further preferably characterized by a pentad isotacticity when measured by NMR of higher than 97.0%, more preferably higher than 98.0% and most preferably higher than 98.5%.

In another aspect, the polypropylene base resin according to the present invention preferably has a crystallization temperature T$_{CR}$ as measured by DSC of 125° C. or higher.

When the crystallinity of the polypropylene is not sufficient, the stiffness will be moderate.

In yet another aspect the polypropylene base resin is characterized by a single Tg when subjected to DSC analysis.

The polypropylene base resin according to the present invention preferably has a molecular weight distribution broadness Mw/Mn of 5.0 to 15.0, preferably of 5.0 to 10.0, most preferably 5.0 to 8.0, determined by GPC according to ISO 16014-4 2003. The molecular weight distribution broadness reflects the broadness of the molecular weight distribution.

Moreover, the polypropylene base resin according to the present invention preferably has a weight average molecular weight M$_w$ of the polypropylene of 125 000 g/mol or lower determined by GPC according to ISO 16014-4 2003, more preferably a M$_w$ of 150 000 g/mol or lower, preferably of 130 000 g/mol or lower, and most preferably of 120 000 g/mol or lower, all M$_w$ values being determined by GPC according to ISO 16014-4 2003. Usually the weight average molecular weight M$_w$ of the polypropylene base resin will be 50 000 g/mol or higher.

The polypropylene composition according to the present invention preferably has a tensile modulus as determined according to ISO 527-2 on injection-moulded test specimens (dog bone shape, 4 mm thickness) as described in EN ISO 1873-2 of at least 2050 MPa, more preferably of at least 2100 MPa, even more preferably at least 2200 MPa, most preferably of at least 2250 MPa.

The polypropylene base resin according to the present invention preferably has an ethylene content of below 1.5 wt.-%, more preferably below 1.0 wt.-%.

The inventive polypropylene base resin most preferably is a homopolymer.

The polypropylene composition is preferably obtainable by a process as described in the following. The present invention is insofar concerned with polypropylene compositions obtainable by the process as described in the following.

The polymerization for obtaining the inventive polypropylene composition is effected in the presence of a catalyst system including a Ziegler Natta catalyst and either diethylaminomethyl triethoxysilane (donor U)

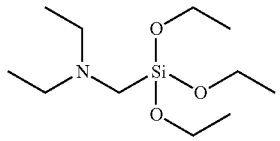

or dicyclopentanedimethoxysilane (DCPDMS, donor D) the mole ratio of Al/external donor being in the range of 0.5 to 50. More preferably, the mole ratio of Al/external donor is in the range of 2.0 to 40, even more preferably in the range of 5.0 to 30 and most preferably in the range of 8.0 to 15. These ranges refer to the total external donor fed into the reaction zones. A skilled person will understand that the feed of the external donor can be split over the three reaction zones.

In a first reaction zone a first intermediate polypropylene with an $MFR_2$ in the range of at 200 to 2000 g/10 min, preferably 300 to 1500 g/10 min, more preferably 350 to 1100 g/10 min and most preferably 375 to 900 g/10 min (ISO 1133; 230° C., 2.16 kg load) is formed.

This intermediate polypropylene contributes to 30 to 70 wt.-% to the total polypropylene as obtained after the third reactor and also denoted "third intermediate polypropylene". More preferably the first intermediate polypropylene contributes to 35 to 65 wt.-% and most preferably 40 to 62 wt.-% to the total polypropylene as obtained after the third reactor and also denoted "third intermediate polypropylene".

The first intermediate polypropylene is transferred to a second reaction zone and further polymerized to form a second intermediate polypropylene having an $MFR_2$ in the range of 80 to 800 g/10 min, preferably 100 to 600 g/10 min, more preferably 200 to 550 g/10 min, and most preferably 250 to 500 g/10 min (ISO 1133; 230° C., 2.16 kg load); forming the second intermediate polypropylene.

Preferably 20 to 50 wt.-% of the total polypropylene before compounding, i.e. of third intermediate polypropylene is produced in the second reaction zone; more preferably 22 to 45 wt.-% and most preferably 23 to 42 wt.-%.

The product obtained in the second reaction zone is transferred to the third reaction zone and further polymerized forming the third intermediate polypropylene.

Preferably, the second intermediate polypropylene is further polymerized in the third reaction zone to form the third intermediate polypropylene having an $MFR_2$ in the range of 50 to 300 g/10 min (ISO 1133; 230° C., 2.16 kg load), more preferably an $MFR_2$ in the range of 60 to 280 g/10 min (ISO 1133; 230° C., 2.16 kg load), and most preferably in the range of 65 to 250 g/10 min (ISO 1133; 230° C., 2.16 kg load).

It is self-explanatory that the reaction conditions in the different reaction stages are different. Thus, the first, second and third intermediate polypropylene differ at least as to one physical characteristic. Preferentially, the second intermediate polypropylene has an $MFR_2$ of up to $0.9 \cdot MFR_2$ (first intermediate polypropylene) as the upper limit and an $MFR_2$ of at least $0.3 \cdot MFR_2$ (first intermediate polypropylene) as the lower limit.

Preferably 10 to 25 wt.-% of the total polypropylene before compounding, i.e. of third intermediate polypropylene is produced in the third reaction zone; more preferably 12 to 22 wt.-% and most preferably 13 to 20 wt.-%. The fraction produced in the third reaction zone preferably has an $MFR_2$ as calculated from the $MFR_2$ of the third intermediate polypropylene and the $MFR_2$ of the second intermediate polypropylene in the range of 1 to 20 g/10 min, preferably in the range of 2 to 15 g/10 min, most preferably in the range of 3 to 12 g/10 min. The method of calculation is given in the experimental part.

Optionally and preferably the third intermediate polypropylene is subjected to a compounding step. The compounding is operated under conditions that the final melt flow rate $MFR_2$ is modified to a degree of less than 10% with respect to the melt flow rate $MFR_2$ of the third intermediate product. Preferably, additives in an amount of up to 2 wt % with respect to the final composition may be added. Preferably, the additives are selected from the group of antioxidants acid scavengers, UV stabilizers, α-nucleating agents, slip agents, antistatic agents and combinations thereof.

The polypropylene composition obtainable by this process is preferably characterized by the features as described above with respect to the inventive polypropylene composition. Thus, all preferred ranges as to ethylene content, molecular weight distribution, broadness $M_w/M_n$, $MFR_2$, tensile modulus, lamella thickness distribution, xylene soluble content XS, pentad isotacticity, and crystallization temperature $T_{CR}$.

The present invention is further concerned with a process as described above and a process as described in the following.

As regards the catalyst system, the donor plays an important role for producing high MFR compositions.

Suitable catalysts are Ziegler-Natta catalysts containing at least Ti, Cl, Mg and Al. Preferably a prepolymerized heterogeneous catalyst is used. Preferably the polypropylene base resin is obtained by a multistage polymerization process, as described above, in the presence of a catalyst system comprising as component (i) a Ziegler-Natta procatalyst which contains a trans-esterification product of a lower alcohol and a phthalic ester.

The procatalyst used according to the invention is preferably prepared by
a) reacting a spray crystallized or emulsion solidified adduct of $MgCl_2$ and a $C_1$-$C_2$ alcohol with $TiCl_4$
b) reacting the product of stage a) with a dialkylphthalate of formula (I)

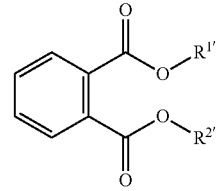

(I)

wherein R1' and R2' are independently at least a $C_5$ alkyl under conditions where a transesterification between said $C_1$ to $C_2$ alcohol and said dialkylphthalate of formula (I) takes place to form the internal donor
c) washing the product of stage b) or
d) optionally reacting the product of step c) with additional $TiCl_4$.

The procatalyst is produced as defined for example in the patent applications WO 87/07620, WO 92/19653, WO 92/19658 and EP 0 491 566. The content of these documents is herein included by reference.

First an adduct of $MgCl_2$ and a $C_1$-$C_2$ alcohol of the formula $MgCl_2 \cdot nROH$, wherein R is methyl or ethyl and n is 1 to 6, is formed. Ethanol is preferably used as alcohol. The adduct, which is first melted and then spray crystallized or emulsion solidified, is used as catalyst carrier.

In the next step the spray crystallized or emulsion solidified adduct of the formula $MgCl_2 \cdot nROH$, wherein R is methyl or ethyl, preferably ethyl and n is 1 to 6, is contacted with TiCl$_4$ to form a titanized carrier, followed by the steps of
adding to said titanised carrier
(i) a dialkylphthalate of formula (I) with R1' and R2' being independently at least a C$_5$-alkyl, like at least a C$_8$-alkyl,
or preferably
(ii) a dialkylphthalate of formula (I) with R1' and R2' being the same and being at least a C$_5$-alkyl, like at least a C$_8$-alkyl,
or more preferably
(iii) a dialkylphthalate of formula (I) selected from the group consisting of propylhexylphthalate (PrHP), dioctylphthalate (DOP), di-iso-decylphthalate (DIDP), and ditridecylphthalate (DTDP), yet more preferably the dialkylphthalate of formula (I) is a dioctylphthalate (DOP), like di-iso-octylphthalate or diethylhexylphthalate, in particular diethylhexylphthalate,
to form a first product,
subjecting said first product to suitable transesterification conditions, i.e. to a temperature above 100° C., preferably between 100 to 150° C., more preferably between 130 to 150° C., such that said methanol or ethanol is transesterified with said ester groups of said dialkylphthalate of formula (I) to form preferably at least 80 mol-%, more preferably 90 mol-%, most preferably 95 mol.-%, of a dialkylphthalate of formula (II)

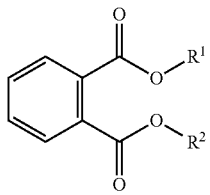

(II)

with R1 and R2 being methyl or ethyl, preferably ethyl, the dialkylphthalate of formula (II) being the internal donor and
recovering said transesterification product as the procatalyst composition (component (i)).

The adduct of the formula MgCl$_2$*nROH, wherein R is methyl or ethyl and n is 1 to 6, is in a preferred embodiment melted and then the melt is preferably injected by a gas into a cooled solvent or a cooled gas, whereby the adduct is crystallized into a morphologically advantageous form, as for example described in WO 87/07620.

This crystallized adduct is preferably used as the catalyst carrier and reacted to the procatalyst useful in the present invention as described in WO 92/19658 and WO 92/19653.

As the catalyst residue is removed by extracting, an adduct of the titanised carrier and the internal donor is obtained, in which the group deriving from the ester alcohol has changed. In case sufficient titanium remains on the carrier, it will act as an active element of the procatalyst. Otherwise the titanization is repeated after the above treatment in order to ensure a sufficient titanium concentration and thus activity.

Preferably the procatalyst used according to the invention contains not more than 2.5 wt.-% of titanium, preferably not more than 2.2% wt.-% and more preferably not more than 2.0 wt.-%. Its donor content is preferably between 4 to 12 wt.-% and more preferably between 6 and 10 wt.-%.

More preferably the procatalyst used according to the invention has been produced by using ethanol as the alcohol and dioctylphthalate (DOP) as dialkylphthalate of formula (I), yielding diethyl phthalate (DEP) as the internal donor compound.

Still more preferably the catalyst used according to the invention is the BCF20P catalyst of Borealis (prepared according to WO 92/19653 as disclosed in WO 99/24479; especially with the use of dioctylphthalate as dialkylphthalate of formula (I) according to WO 92/19658) or the catalyst Polytrack 8502, commercially available from W. R. Grace, Columbia Mass., USA.

For the production of the polypropylene base resin according to the invention the catalyst system used preferably comprises in addition to the special Ziegler-Natta procatalyst an organometallic cocatalyst as component (ii).

Accordingly it is preferred to select the cocatalyst from the group consisting of trialkylaluminum, like triethylaluminum (TEA), dialkyl aluminum chloride and alkyl aluminum sesquichloride.

Component (iii) of the catalyst system used is an external donor represented by formula (I) or (II)

Si(OCH$_3$)$_2$(R$^5$)$_2$      (IIIa)

wherein R$^5$ represents a branched-alkyl group having 3 to 12 carbon atoms, preferably a branched-alkyl group having 3 to 6 carbon atoms, or a cyclo-alkyl having 4 to 12 carbon atoms, preferably a cyclo-alkyl having 5 to 8 carbon atoms.

It is in particular preferred that R$^5$ is selected from the group consisting of iso-propyl, iso-butyl, iso-pentyl, tert.-butyl, tert.-amyl, neopentyl, cyclopentyl, cyclohexyl, methylcyclopentyl and cycloheptyl.

Formula (IIIb) is defined by

Si(OCH$_2$CH$_3$)$_3$(NR$_x$R$_y$)      (II)

wherein R$_x$ and R$_y$ can be the same or different a represent a hydrocarbon group having 1 to 12 carbon atoms.

R$_x$ and R$_y$ are independently selected from the group consisting of linear aliphatic hydrocarbon group having 1 to 12 carbon atoms, branched aliphatic hydrocarbon group having 1 to 12 carbon atoms and cyclic aliphatic hydrocarbon group having 1 to 12 carbon atoms. It is in particular preferred that R$_x$ and R$_y$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl.

More preferably both R$_x$ and R$_y$ are the same, yet more preferably both R$_x$ and R$_y$ are an ethyl group.

As mentioned above, the external donor of formula (II) is preferably diethylaminomethyltriethoxysilane.

For obtaining polypropylene compositions having very high melt flow rate (for example MFR$_2$>120 g/10 min), the external donor is preferably of formula (I), like dicyclopentyl dimethoxy silane [Si(OCH$_3$)$_2$(cyclo-pentyl)$_2$] or diisopropyl dimethoxy silane [Si(OCH$_3$)$_2$(CH(CH$_3$)$_2$)$_2$]. Most preferably, the external donor is dicyclopentyl dimethoxy silane.

In a further embodiment, the Ziegler-Natta procatalyst can be modified by polymerising a vinyl compound in the presence of the catalyst system, comprising the special Ziegler-Natta procatalyst (component (i)), an external donor (component (iii) and optionally a cocatalyst (component (ii)), which vinyl compound has the formula:

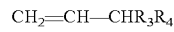

CH$_2$=CH—CHR$_3$R$_4$ wherein R$_3$ and R$_4$ together form a 5- or 6-membered saturated, unsaturated or aromatic ring or independently represent an alkyl group comprising 1 to 4 carbon atoms, and the modified catalyst is used for the preparation of the heterophasic propylene copolymer according to this invention. The polymerized vinyl compound can act as an α-nucleating agent.

Concerning the modification of the catalyst, reference is made to the international applications WO 99/24478, WO 99/24479 and particularly WO 00/68315, incorporated herein by reference with respect to the reaction conditions concerning the modification of the catalyst as well as with respect to the polymerization reaction.

The Ziegler-Natta system may be e.g. an inorganic halide (e.g. $MgCl_2$) supported titanium catalyst, together with an aluminium alkyl (e.g. triethylaluminium) cocatalyst.

From a functional perspective, the external donors are limited to donors having suitable hydrogen response. As described above, standard silane donors such as dicyclopentyldimethoxysilane (DCPDMS donor D), cyclohexylmethyldimethoxysilane (CHMDMS or donor C) may be used as external donors for the production of the inventive polypropylene base resin having a final melt flow rate $MFR_2$ (ISO 1133, 230° C., 2.16 kg load) in the range of 60 g/10 min to 90 g/10 min.

For polypropylene base resins and compositions according to the present invention having a final melt flow rate $MFR_2$ (ISO 1133, 230° C., 2.16 kg load) of more than 90 g/10 min external donors with even better hydrogen response are required. The most preferred donor for polypropylene compositions having an $MFR_2$ (ISO 1133, 230° C., 2.16 kg load) of more than 90 g/10 min is diethylaminomethyl triethoxysilane (often denoted as Donor U).

Preferred catalyst systems are described in EP 0 491 566 A1 or in EP 0 591 224 A1 being incorporated by reference herewith. Concerning the modification of the catalyst, reference is made to the international applications WO 99/24478, WO 99/24479 and particularly WO 00/68315, incorporated herein by reference with respect to the reaction conditions concerning the modification of the catalyst.

The mole ratio of Al/external donor usually is in the range of 2.0 to 40. Preferably the mole ratio of Al/external donor usually is in the range of 5.0 to 30 and, most preferable, in the range of 8.0 to 15.

A preferred Ziegler Natta catalyst is of the type BCF20P (proprietary specification of Borealis AG) with diethylaminomethyltriethoxysilane as external donor (donor U), an Al/Ti ratio (mol/mol) of 200 and an Al/donor ratio (mol/mol) of 8 to 15.

The present invention is further concerned with a material comprising the polypropylene composition as described herein and a filler.

Apart from the advantages mentioned above, it has been surprisingly found that the materials comprising the inventive polypropylene composition having inter alia an $MFR_2$ measured according to ISO 1133 (230° C., 2.16 kg load) of at least 50 g/10 min and a filler remain their excellent balance of stiffness and melt flow rate even when blended with further polypropylene having an ethylene content of below 1.5 wt.-% and an melt flow rate $MFR_2$ measured according to ISO 1133 (230° C., 2.16 kg load) of at least 10 g/10 min.

In other words, the surprisingly high stiffness of the materials for a given melt flow rate of the polymer base resin is maintained even for materials containing a base resin having an melt flow rate $MFR_2$ measured according to ISO 1133 (230° C., 2.16 kg load) of lower than 50 g/10 min.

The present invention insofar is also concerned with a material comprising a polyproylene composition and a filler, whereby the polypropylene composition consists of a first polypropylene base resin,
a second polypropylene base resin, and
additives,
the first and the second polypropylene base resin being present in a total amount of 96 wt.-%, and
the additives being present in an amount of up to 4 wt.-%, with respect to the sum of polypropylene base resins and additives
wherein the first polypropylene base resin has
lamellas of a thickness from 24.2 nm to 84.6 nm in an amount of at least 40% when measured by stepwise isothermal segregation technique (SIST); and
a molecular weight distribution broadness Mw/Mn as calculated from gel permeation chromatography according to ISO 16014-4 2003, of at least 5, and
the polypropylene composition having an $MFR_2$ measured according to ISO 1133 (230° C., 2.16 kg load) of at least 50 g/10 min; and
a tensile modulus of 2000 MPa or higher when measured according to ISO 527-2 using injection moulded test specimens T as described in EN ISO 1873-2 (dog bone shape, 4 mm thickness), and
wherein the second polypropylene base resin has
an $MFR_2$ measured according to ISO 1133 (230° C., 2.16 kg load) of at least 10 g/10 min and an ethylene content of below 1.5 wt.-%.

All preferred ranges as specified for the base resin above also comply for the first base resin in the material. All embodiments denoted preferred are incorporated by reference also with respect to the material including a first base resin, a second base resin and additives.

The second polypropylene base resin preferably has an ethylene content of below 1.0 wt.-%, more preferably below 0.5 wt.-%.

Preferably the inventive material consists of the polyproylene composition as described and a filler.

The second polypropylene base resin is preferably obtainable by a process comprising,
polymerizing propylene in the presence of a catalyst system including a Ziegler Natta catalyst and diethylaminomethyl triethoxysilane

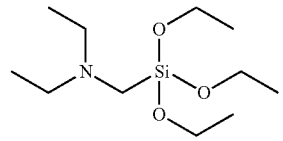

or dicyclopentane dimethoxysilane (CD P PDMS) as an external donor the mole ratio of Al/external donor in the range of 3 to 8
whereby,
(i) a first intermediate polypropylene with an $MFR_2$ of 100 g/10 min to 250 g/10 min (ISO 1133; 230° C., 2.16 kg load) is formed in a first reaction zone;
(ii) the first intermediate polypropylene is further polymerized in a second reaction zone to form a second intermediate polypropylene having an $MFR_2$ of 20 to 90 g/10 min (ISO 1133; 230° C., 2.16 kg load);
(iii) the second intermediate polypropylene is further polymerized in a third reaction zone to form the third intermediate polypropylene having an $MFR_2$ of 10 to 49 g/10 min (ISO 1133; 230° C., 2.16 kg load);
and optionally compounding the third intermediate polypropylene to form the second polypropylene base resin having an $MFR_2$ of 10 to 49 g/10 min or higher (ISO 1133; 230° C., 2.16 kg load).

Further preferably, the first base resin and the second base resin are present in a weight ratio of from of 15:85 to 85:15, more preferably 15:85 to 50:50.

The fillers are preferably selected from fibers and tablets. Preferably the filler is a mineral filler, more preferably an anisotropic mineral filler.

In a preferred embodiment the filler is selected from talc, mica and wollastonite. More preferably the filler is talc.

The filler preferably has a median particle size d50 [mass percent] determined by sedimentation techniques of equal or more than 0.5 micrometer, more preferably equal or more than 0.8 micrometer, most preferably equal or more than 1.0 micrometer. The particle size d50 [mass percent] determined by sedimentation techniques preferably does not exceed 5.0 micrometer, more preferably does not exceed 4.0 micrometer.

Typical examples for commercially available talc products are Luzenac A7C, Steamic T1 CA, Jetfine 3CA and HAR (high aspect ratio) talc.

In another preferred embodiment the filler is selected from glass and carbon fibers.

The preferred glass fibers to be used for preparing the inventive materials are chopped glass fibers having a length of 3 to 15 mm, more preferably 3 to 10 mm. In preferred embodiments the materials are prepared by glass fibers having lengths of about 4.5 mm.

The glass fibers preferably have diameters of 10 to 20 micrometers.

The glass fibers in another aspect preferably are amino-silane or silane coated. Amino-silane or silane coated glass fibers are commercially available and have become an industrial standard. Typical examples for commercially available glass fibers are Vetrotex EC13 4.5 mm 968 or PPG MaxiChop 3299 EC13 4.5 mm.

When glass fibers are used, the material usually will contain also at least one adhesion promoter, preferably a maleic anhydride functionalized polyproyplene. A typical example for an adhesion promoter is Exxelor PO1020. The amount of adhesion promoter depends on the amount of glass fiber and preferably will amount to (0.03*amount of glass fiber) to (0.10*amount of glass fiber). Thus when 20 wt.-% glass fibers (with respect to the total material) are used, the adhesive promoter preferably will be used in an amount of 0.6 to 2.0 wt.-% with respect to the total material. When 40 wt.-% glass fibers (with respect to the total material) are used, the adhesive promoter preferably will be used in an amount of 1.2 to 4.0 wt.-% with respect to the total material.

The inventive materials preferably include 15 to 45 wt.-% of filler, more preferably 20 to 40 wt.-%.

The inventive materials typically comprise up to 4 wt.-% of additives. Additives are preferably selected from the group of acid scavengers, antioxidants, hindered amine light stabilizers (HALS), slip agents (SA) and pigments.

In the inventive materials, further advantages are obtained. Particularly the balance of shrinkage and crystallinity is enhanced. High crystallinity is usually accompanied by high, i.e. undesirable shrinkage being a measure for dimensional stability. The inventive polypropylene compositions nevertheless allow lowest shrinkage when used with fillers.

In yet another aspect the present invention is concerned with the use of the inventive polypropylene compositions for increasing temperature resistance. Increasing shall mean an improvement of temperature resistance with respect to commercial products such as conventional polypropylene homopolymers like HK060AE commercially available from Borealis Polyolefine GmbH, Austria, characterized by an MFR2 (ISO 1133) of 125 g/10 min and a heat deflection temperature (ISO 75 B) of 90° C. or Moplen HP500V commercially available from LyondellBasell Industries, The Netherlands, characterized by an MFR2 (ISO 1133) of 120 g/10 min and a heat deflection temperature (ISO 75 B) of 90° C.

EXPERIMENTAL PART

Measurement Methods a) Molecular Weight Distribution from Gel Permeation Chromatography (GPC)

The weight average molecular weight Mw and the molecular weight distribution (MWD=Mw/Mn wherein Mn is the number average molecular weight and Mw is the weight average molecular weight) is measured by a method based on ISO 16014-1:2003 and ISO 16014-4:2003. A Waters Alliance GPCV 2000 instrument, equipped with refractive index detector and online viscosimeter was used with 3×TSK-gel columns (GMHXL-HT) from TosoHaas and 1,2,4-trichlorobenzene (TCB, stabilized with 200 mg/L 2,6-Di tert butyl-4-methyl-phenol) as solvent at 145° C. and at a constant flow rate of 1 mL/min. 216.5 µL of sample solution were injected per analysis. The column set was calibrated using relative calibration with 19 narrow MWD polystyrene (PS) standards in the range of 0.5 kg/mol to 11 500 kg/mol and a set of well characterised broad polypropylene standards (the Mark-Houwink constant K: 9.54*10-5 and a: 0.725 for PS, and K: 1.91*10-4 and a: 0.725 for PP). All samples were prepared by dissolving 5-10 mg of polymer in 10 mL (at 160° C.) of stabilized TCB (same as mobile phase) and keeping for 3 hours with continuous shaking prior sampling in into the GPC instrument. The ratio of Mw and Mn is a measure of the broadness of the distribution, since each is influenced by the opposite end of the "population".

b) Melt Flow Rate

The melt flow rate is measured as the $MFR_2$ in accordance with ISO 1133 (230° C., 2.16 kg load) for polypropylene and is indicated in g/10 min. The MFR is an indication of the flowability, and hence the processability, of the polymer. The higher the melt flow rate, the lower the viscosity of the polymer.

The calculation of melt flow rate $MFR_2$ of the polypropylene produced in the third reaction zone (R3) is performed as follows:

$$MFR(R3) = 10^{\left[\frac{\log(MFR(PP3)) - w(PP2) \times \log(MFR(PP2))}{w(R3)}\right]}$$

wherein w(PP2) is the weight fraction of the second intermediate polypropylene, i.e. the product of the first and the second reaction zone (PP2), w(R3) is the weight fraction of the polypropylene produced in the third reaction zone ($R_3$), MFR(PP2) is the melt flow rate $MFR_2$ [in g/10 min] measured according ISO 1133 at 230° C. of the second intermediate polypropylene, i.e. the product of the first and the second reaction zone (PP2), MFR(PP3) is the melt flow rate $MFR_2$ [in g/10 min] measured according ISO 1133 at 230° C. of the third intermediate polypropylene, MFR(R3) is the calculated melt flow rate $MFR_2$ (230° C.) [in g/10 min] of the polypropylene produced in the third reaction zone ($R_3$).

c) Xylene Soluble Fraction

The xylene soluble fraction (XS) as defined and described in the present invention is determined as follows: 2.0 g of the polymer are dissolved in 250 ml p-xylene at 135° C. under agitation. After 30 minutes, the solution was allowed to cool for 15 minutes at ambient temperature and then allowed to settle for 30 minutes at 25±0.5° C. The solution was filtered with filter paper into two 100 ml flasks. The solution from the first 100 ml vessel was evaporated in nitrogen flow and the residue dried under vacuum at 90° C. until constant weight is reached. The xylene soluble fraction (wt %) can then be determined as follows:

$$XS=(100 \times m1 \times V0)/(m0 \times V1),$$

wherein m0 designates the initial polymer amount (g), m1 defines the weight of residue (g), V0 defines the initial volume (ml) and V1 defines the volume of the analyzed sample (ml).

d) Differential Scanning Calorimetry (DSC)

The melting temperature Tm, crystallisation temperature Tc and melting enthalpy Hm are measured with a Mettler TA820 differential scanning calorimetry device (DSC) on 3±0.5 mg samples in accordance with ISO 11357-3:1999. Crystallisation and melting temperatures are obtained during 10° C./min cooling and heating scans between 30° C. and 225° C. Melting and crystallisation temperatures were taken as the peaks of the endotherms and exotherms.

e) Stepwise Isothermal Segregation Technique (SIST)

The isothermal crystallisation for SIST analysis was performed in a Mettler TA 820 DSC on 3±0.5 mg samples at decreasing temperatures between 200° C. and 105° C.

(i) the samples were melted at 225° C. for 5 min.,
(ii) then cooled with 80° C./min to 145° C.
(iii) held for 2 hours at 145° C.,
(iv) then cooled with 80° C./min to 135° C.
(v) held for 2 hours at 135° C.,
(vi) then cooled with 80° C./min to 125° C.
(vii) held for 2 hours at 125° C.,
(viii) then cooled with 80° C./min to 115° C.
(ix) held for 2 hours at 115° C.,
(x) then cooled with 80° C./min to 105° C.
(xi) held for 2 hours at 105° C.

After the last step the sample was cooled down with 80° C./min to −10° C. and the melting curve was obtained by heating the cooled sample at a heating rate of 10° C./min up to 200° C. All measurements were performed in a nitrogen atmosphere. The melt enthalpy is recorded as function of temperature and evaluated through measuring the melt enthalpy of fractions melting within temperature intervals of 10° C. in the range from 50 to 200° C.

The melting curve of the material crystallised this way can be used for calculating the lamella thickness distribution according to Thomson-Gibbs equation.

$$T_m = T_0 \left(1 - \frac{2\sigma}{\Delta H_0 \cdot L}\right)$$

where $T_0$=457K, $\Delta H_0$=134×106 J/m$^3$, σ=0,049.6 J/m$^2$ and L is the lamella thickness in nm. An inversion of this formula results in $$L=0.74.457/(457-T_m) nm$$

The amount of a certain lamella thickness range is obtained by relating the relative enthalpy integral of said fraction to the total enthalpy. Further details of the method can be found in the following two references incorporated by reference herewith:

J. A. Parker, D. C. Bassett, R. H. Olley, P. Jaaskelainen; On high pressure crystallization and the characterization of linear low-density polyethylenes; A. Wlochowicz, M. Eder; Distribution of lamella thicknesses in isothermally crystallized polypropylene and polyethylene by differential scanning calorimetry; Polymer 1984, 25 (9), 1268-1270 f) Determination of Isotacticity

The $^{13}$C-NMR spectra of polypropylenes were recorded on Bruker 400 MHz spectrometer at 130° C. from samples dissolved in 1,2,4-trichlorobenzene/benzene-d6 (90/10 wt/wt). All spectra were recorded using a $^{13}$C optimised 10 mm extended temperature probehead at 125° C. using nitrogen gas for all pneumatics For the pentad analysis the assignment is done according to the methods described in literature: (T. Hayashi, Y. Inoue, R. Chüjö, and T. Asakura, Polymer 29 138-43 (1988) and Chujo R, et al, Polymer 35 339 (1994). The NMR-measurement was used for determining the mmmm pentad concentration in a manner well known in the art.

g) Tensile Test

The tensile properties are determined according to ISO 527-2 (23° C.) using injection molded specimens as described in EN ISO 1873-2 (dog bone shape, 4 mm thickness). Tensile modulus is determined in the linear range of the stress/strain curve at a cross head speed of 1 mm/min; the test is then continued at a cross head speed of 10 mm/min until the sample breaks, determining tensile strength results from as the maximum force measured divided by the cross-sectional area of the test specimen.

h) Shrinkage Measurement

The shrinkage was determined on injection moulded circular disks (diameter 180 mm, thickness 3 mm). The center-gated specimens were moulded applying two different holding pressure times (10 and 20 seconds). 96 h after the production of samples the dimensional change radial and tangential to the flow front was measured for both disks. The average shrinkage for both holding pressure times is reported as final result.

i) Heat Deflection Temperature (HDT)

HDT is measured on injection moulded test specimen as described in EN ISO 1873-2 (80×10×4 mm$^3$) that are placed in a heating bath, resting horizontally on two supports according to ISO 75B. A constant load (0.45 MPa) is applied in the centre of the specimen (three-point bending) and the bath temperature is raised at a constant rate. The temperature of the bath at which the flexural deflection of the loading point has reached a predefined level is the heat deflection temperature of the material.

Experiments

Inventive polypropylene compositions IE1 to IE4 have been produced in a Borstar™ pilot plant using one liquid-phase loop reactor and two gas phase reactors under conditions as shown in Table 1. The first reaction zone was a loop reactor and the second and third reaction zones were gas phase reactors. The catalyst system was a vinylcyclohexyl (VCH)-modified catalyst of the type BCF20P, prepared according to Example 1 of WO99/24479 in combination with a triethylaluminum (TEA) cocatalyst and either dicyclopentyl dimethoxysilane (donor D) or diethylaminotriethoxysilane (donor U) as an external donor at a ratio TEA/propylene of 0.2 g/kg and TEA/donor ratios as indicated in the table.

TABLE 1

|  |  | IE1 | IE2 | IE3 | IE4 |
|---|---|---|---|---|---|
|  | Catalyst | BCF20P BNT | BCF20P BNT | BCF20P BNT | BCF20P BNT |
|  | B1 Donor type | D | U | U | U |
|  | B1 Al/donor ratio (mol/mol) | 14 | 10 | 9 | 10 |
| LOOP | B2 MFR$_2$ (g/10 min) | 255 | 315 | 427 | 512 |
|  | B2 XS (%) | 2.6 | 3.2 | 2.1 | 2.4 |

TABLE 1-continued

|  |  | IE1 | IE2 | IE3 | IE4 |
|---|---|---|---|---|---|
|  | B2 amount total (%) | 41 | 43 | 44 | 57 |
| GPR1 | B3 MFR$_2$ (g/10 min) | 125 | 119 | 260 | 420 |
|  | B3 XS (%) | 1.6 | 1.8 | 2.1 | 1.9 |
|  | B3 MFR$_2$ (g/10 min) made in GPR1 | 60 | 41 | 152 | 272 |
|  | B3 amount total (%) | 40 | 40 | 40 | 26 |
| GPR2 | B4 XS (%) | 1.5 | 1.5 | 1.9 | 1.9 |
|  | B4 MFR$_2$ (g/10 min) made in GPR2 | 5 | 5 | 7 | 6 |
| Product | XS PP product (%) | 1.5 | 1.6 | 2 | 2 |
|  | MFR$_2$ PP product (g/10 min) | 68 | 73 | 150 | 230 |

The inventive polypropylene compositions were tested as shown in Table 2. Comparative Example CE1 is the commercial high crystallinity PP homopolymer HF955MO having an MFR$_2$ of 20 g/10 min from Borealis Polyolefine GmbH (Austria), and CE2 Is the commercial PP homopolymer HK060AE having an MFR$_2$ of 125 g/10 min from Borealis Polyolefine GmbH (Austria).

TABLE 2

|  |  | CE1 HF955 MO* | CE2 HK060 AE | IE1 | IE2 | IE3 | IE4 |
|---|---|---|---|---|---|---|---|
| MFR$_2$ | g/10 min | 20 | 125 | 68 | 73 | 150 | 230 |
| Tm (DSC) | °C. | 167 | 161 | 166 | 167 | 167 | 166 |
| Hm (DSC) | J/g | 119 | 112 | 123 | 119 | 104 | 129 |
| T$_{CR}$ (DSC) | °C. | 131 | 113 | 127 | 127 | 127 | 127 |
| Mw (SEC) | kg/mol | 230 | 180 | 117 | 116 | n.d. | 87 |
| Mw/Mn (SEC) | — | 4.8 | 5.0 | 6.4 | 6.8 | n.d. | 6.3 |
| Tens. Modulus | MPa | 2200 | 1600 | 2257 | 2271 | 2270 | 2332 |
| Tens. Strength | MPa | 42 | 36 | 44 | 44 | 39 | 39 |
| Lamellae fraction 24.16-84.55 nm (SIST) | % | 38 | 2.5 | 42 | 49 | 48 | 55 |
| Pentad isotacticity ($^{13}$C-NMR) | mol % | 98.0 | 95.0 | 99.1 | 98.4 | 98.5 | 98.4 |
| HDT | °C. | 114 | 90 | 114 | 115 | 118 | 120 |
| Shrinkage radial | % | 1.74 | 1.60 | 1.79 | 1.8 | 1.83 | 1.86 |
| Shrinkage tangential | % | 1.68 | 1.54 | 1.74 | 1.75 | 1.79 | 1.80 |

(*contains 0.4 wt % talc,
n.d.—not determined)

For blending purposes a further composition has been produced.

TABLE 3

|  |  | BE5 |
|---|---|---|
|  | Catalyst | BCF20P BNT |
|  | B1 Donor type | D |
|  | B1 Al/donor ratio (mol/mol) | 5 |
| LOOP | B2 MFR$_2$ (g/10 min) | 136 |
|  | B2 XS (%) | 1.6 |
|  | B2 amount total (%) | 40.5 |
| GPR1 | B3 MFR$_2$ (g/10 min) | 60 |
|  | B3 XS (%) | 1.6 |
|  | B3 MFR$_2$ (g/10 min) made in GPR1 | 26 |
|  | B3 amount total (%) | 40.5 |
| GPR2 | B4 XS (%) | 1.3 |
|  | B4 MFR$_2$ (g/10 min) made in GPR2 | 0.25 |
| Product | XS PP product (%) | 1.3 |
|  | MFR$_2$ PP product (g/10 min) | 20 |

IE3 was blended with varying parts of BE5 and the fillers talc and glass fiber respectively as shown in the following table.

TABLE 4

All amounts given in parts per weight

| Description | CE3 standard homo-PP blend | CE4 standard homo-PP Blend Talc filled | CE5 standard homo-PP blend Talc filled | CE6 standard homo-PP blend GF filled | CE7 standard homo-PP blend GF-filled | IE5 Inventive blend | IE6 Inventive blend Talc filled | IE7 Inventive blend Talc filled | IE8 Inventive blend GF filled | IE9 Inventive blend GF-filled |
|---|---|---|---|---|---|---|---|---|---|---|
| HG265FB | 77.05 | 62.05 | 46.05 | 61.65 | 44.45 | 0 | 0 | 0 | 0 | 0 |
| HK060AE | 21 | 16 | 12 | 16 | 12 | 0 | 0 | 0 | 0 | 0 |
| IE3 (cf. Table 2) | 0 | 0 | 0 | 0 | 0 | 29.05 | 23.05 | 17.05 | 23.65 | 16.45 |
| BE5 (cf. Table 3) | 0 | 0 | 0 | 0 | 0 | 69 | 55 | 41 | 54 | 40 |
| STEAMIC T1CA |  | 20 | 40 |  |  |  | 20 | 40 |  |  |
| GLASS 1.1 |  |  |  | 20 | 40 |  |  |  | 20 | 40 |
| Adhesive promoter |  |  |  | 0.8 | 2.0 |  |  |  | 0.8 | 2.0 |

TABLE 4-continued

All amounts given in parts per weight

| Description | CE3 standard homo-PP blend | CE4 standard homo-PP Blend Talc filled | CE5 standard homo-PP blend Talc filled | CE6 standard homo-PP blend GF filled | CE7 standard homo-PP blend GF-filled | IE5 Inventive blend | IE6 Inventive blend Talc filled | IE7 Inventive blend Talc filled | IE8 Inventive blend GF filled | IE9 Inventive blend GF-filled |
|---|---|---|---|---|---|---|---|---|---|---|
| MB 95-BLACK 7-PE-40 | 1.4 | 1.4 | 1.4 | 1 | 1 | 1.4 | 1.4 | 1.4 | 1 | 1 |
| Irganox B 225 | 0.25 | 0.25 | 0.25 | 0.25 | 0.25 | 0.25 | 0.25 | 0.25 | 0.25 | 0.25 |
| Antistatic/Anti-fogging agent | 0.2 | 0.2 | 0.2 | 0.2 | 0.2 | 0.2 | 0.2 | 0.2 | 0.2 | 0.2 |
| acid scavenger | 0.1 | 0.1 | 0.1 | 0.1 | 0.1 | 0.1 | 0.1 | 0.1 | 0.1 | 0.1 |

HG265FB was a standard polypropylene homopolymer produced by Borealis having an melt flow rate (230° C., 2.16 kg) of 26 (g/10 min) and a melting temperature of 161° C.
HK060AE was a standard polypropylene homopolymer produced by Borealis having an melt flow rate (230° C., 2.16 kg) of 125 (g/10 min), a tensile modulus of 1600 MPa (ISO 527-2; 1 mm/min).
Steamic T1CA was talc "Steamic T1CA" produced by Luzenac having a d50(Sedigraph5100) of 1.8 micrometer and a d95(Sedigraph5100) of 6.2 micrometer (measured on compacted material)
Glass 1.1 was glass fiber "EC13 4.5 mm Vetrotex 968" by Vetrotex; fibre diameter 13 micrometer, fibre length 4.5 mm.
Exxelor PO1020 produced by Exxon was used an the adhesive promoter
MB95-BLACK-7-PE-40 was a carbon black masterbatch for coloring (Cabot Plasblak PE1639, 40% carbon black)
Dimodan ML90-1 was used as the antistatic/antifogging agent
Calcium stearate (Faci) was used as the acid scavenger.

TABLE 5

| Description | unit | CE3 standard homo-PP blend | CE4 standard homo-PP Blend Talc filled | CE5 standard homo-PP blend Talc filled | CE6 standard homo-PP blend GF filled | CE7 standard homo-PP blend GF-filled | IE5 Inventive blend | IE6 Inventive blend Talc filled | IE7 Inventive blend Talc filled | IE8 Inventive blend GF filled | IE9 Inventive blend GF-filled |
|---|---|---|---|---|---|---|---|---|---|---|---|
| MFR | g/10 min | 30 | 30 | 33 | 12 | 7 | 32 | 31 | 30 | 12 | 7 |
| ASH CONTENT | wt-% | | 19 | 37 | 20 | 40 | | 19 | 37 | 20 | 40 |
| FILLER CONTENT | wt-% | | 21 | 40 | | | | 21 | 40 | | |
| TENSILE MODULUS | MPa | 1668 | 3091 | 5039 | 5127 | 9641 | 2153 | 3602 | 5614 | 5860 | 10372 |
| TENSILE STRENGTH | MPa | 37 | 35 | 35 | 87 | 128 | 42 | 38 | 37 | 96 | 135 |
| T. STRAIN AT T. STRENGTH | % | 8 | 4 | 2 | 3 | 3 | 6 | 3 | 2 | 3 | 3 |
| T. STRESS AT BREAK | MPa | 31 | 30 | 34 | 87 | 128 | 36 | 33 | 36 | 96 | 135 |
| T. STRAIN AT BREAK | % | 18 | 9 | 2 | 3 | 3 | 10 | 6 | 2 | 3 | 3 |
| NIS (23° C.) | kJ/m$^2$ | 1.8 | 2.1 | 1.3 | 7.9 | 11.5 | 1.4 | 1.6 | 1.3 | 7.5 | 10.7 |
| TYPE OF FAILURE | None | C | C | C | H | H | C | C | C | H | H |
| NIS (−20° C.) | kJ/m$^2$ | — | 1.1 | 1.3 | 7.2 | 10.3 | — | 1.1 | 1.3 | 7.5 | 10.6 |
| TYPE OF FAILURE | None | — | C | C | C | C | — | C | C | C | C |
| SH RADIAL | % | 1.71 | 1.3 | 0.88 | 0.98 | 0.47 | 1.78 | 1.58 | 0.92 | 1.16 | 0.54 |
| SH TANGENTIAL | % | 1.64 | 1.14 | 0.75 | 0.49 | 0.31 | 1.68 | 1.44 | 0.8 | 0.59 | 0.47 |
| SH DIFFERENCE | % | 0.07 | 0.16 | 0.13 | 0.49 | 0.16 | 0.1 | 0.14 | 0.12 | 0.57 | 0.06 |

It can be seen that the excellent balance of properties is maintained in the materials even when the melt flow rate is adjusted via a blending composition (e.g. BI5) to moderate values. Particularly the tensile modulus of IE6 was surprisingly increased compared to CE4, whereas all other properties remained on the same level. Both materials IE6 and CE4 had the same melt flow rate and identical filler content.
The same surprising result was obtained with materials containing glass fibre. Inventive material IE8 showed a tensile modulus of 5860 MPa, whereas CE6 only had a tensile modulus of 5127 MPa.

The invention claimed is:

1. A polypropylene composition comprising a polypropylene base resin, the polypropylene base resin having
    lamellas of a thickness from 24.2 nm to 84.6 nm in an amount of at least 40% when measured by stepwise isothermal segregation technique (SIST); and
    a molecular weight distribution broadness Mw/Mn as calculated from gel permeation chromatography according to ISO 16014-4 2003, of at least 5, and
    a weight average molecular weight Mw of 130,000 g/mol or lower determined by GPC according to ISO 16014-4 2003; and
    the polypropylene composition having an MFR$_2$ measured according to ISO 1133 (230° C., 2.16 kg load) of at least 50 g/10 min; and
    a tensile modulus of 2000 MPa or higher when measured according to ISO 527-2 using injection moulded test specimens T as described in EN ISO 1873-2 (dog bone shape, 4 mm thickness).

2. The polypropylene composition according to claim 1, wherein the polypropylene base resin has a melting temperature of at least 162° C. according to DSC analysis.

3. The polypropylene composition according to claim 1, wherein the polypropylene base resin has a xylene soluble content XS (23° C., ISO 6427) is 2.5 wt.-% or lower.

4. The polypropylene composition according to claim 1, wherein the pentad isotacticity when measured by NMR is higher than 97%.

5. The polypropylene composition according to claim 1, wherein the crystallization temperature $T_{CR}$ as measured by DSC is 125° C. or higher.

6. The polypropylene composition according to claim 1, wherein the polypropylene base resin has a molecular weight distribution broadness Mw/Mn of 5 to 8 determined by GPC according to ISO 16014-4 2003.

7. The polypropylene composition according to claim 1, wherein the polypropylene base resin is a homopolymer.

8. Polypropylene composition obtained by a process comprising
polymerizing propylene in the presence of a catalyst system including (i) a Ziegler Natta catalyst and (ii) diethylaminomethyl triethoxysilane

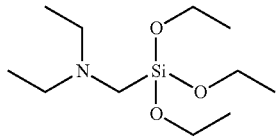

or dicyclopentane dimethoxysilane (CD P PDMS) as an external donor;
wherein the mole ratio of aluminum in the catalyst system to the external donor is in the range of 5 to 30,
whereby,
(i) a first intermediate polypropylene with an MFR$_2$ of 200 g/10 min to 2000 g/10 min (ISO 1133; 230° C., 2.16 kg load) is formed in a first reaction zone;
(ii) the first intermediate polypropylene is further polymerized in a second reaction zone to form a second intermediate polypropylene having an MFR$_2$ of 80 to 800 g/10 min or higher (ISO 1133; 230° C., 2.16 kg load);
(iii) the second intermediate polypropylene is further polymerized in a third reaction zone to form the third intermediate polypropylene having an MFR$_2$ of 50 to 300 g/10 min or higher (ISO 1133; 230° C., 2.16 kg load);
and optionally compounding the third intermediate polypropylene to form the polypropylene composition having an MFR$_2$ of 50 to 300 g/10 min or higher (ISO 1133; 230° C., 2.16 kg load) and a tensile modulus of 2000 MPa or higher when measured according to ISO 527-2 using injection moulded test specimens T as described in EN ISO 1873-2 (dog bone shape, 4 mm thickness),
the polypropylene composition comprising a polypropylene base resin having a molecular weight distribution broadness $M_w/M_n$ as calculated from gel permeation chromatography according to ISO 16014-4 2003, of at least 5.

9. The polypropylene composition according to claim 8, wherein 30 to 70 wt.-% of the third intermediate polypropylene is produced in the first reaction zone; and
optionally wherein 20 to 25 wt.-% of the third intermediate polypropylene is produced in the second reaction zone; and
optionally wherein 10 to 25 wt.-% of the third intermediate polypropylene is produced in the third reaction zone.

10. Process for the production of a polypropylene composition and a tensile modulus of 2000 MPa or higher when measured according to ISO 527-2 using injection moulded test specimens T as described in EN ISO 1873-2 (dog bone shape, 4 mm thickness) in the presence of a catalyst system including a Ziegler Natta catalyst and diethylaminomethyl triethoxysilane

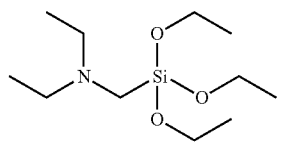 [SMILES: CCO[Si](CN(CC)CC)(OCC)OCC]

as an external donor, whereby the mole ratio of aluminum in the catalyst system to the external donor is in the range of 5 to 30,
whereby,
(i) a first intermediate polypropylene with an MFR$_2$ of 200 g/10 min to 2000 g/10 min (ISO 1133; 230° C., 2.16 kg load) is formed in a first reaction zone;
(ii) the first intermediate polypropylene is further polymerized in a second reaction zone to form a second intermediate polypropylene having an MFR$_2$ of 80 to 800 g/10 min or higher (ISO 1133; 230° C., 2.16 kg load);
(iii) the second intermediate polypropylene is further polymerized in a third reaction zone to form the third intermediate polypropylene having an MFR$_2$ of 50 to 300 g/10 min or higher (ISO 1133; 230° C., 2.16 kg load);
and optionally compounding the third intermediate polypropylene to form the polypropylene composition having an MFR$_2$ of 50 to 300 g/10 min or higher (ISO 1133; 230° C., 2.16 kg load);
the polypropylene composition comprising a polypropylene base resin having a molecular weight distribution broadness $M_w/M_n$ as calculated from gel permeation chromatography according to ISO 16014-4 2003, of at least 5.

11. Process according to claim 10, whereby external donor is fed to the second reaction zone and/or the third reaction zone.

12. A composition of matter comprising a polypropylene composition and a filler,
the polypropylene composition comprising a polypropylene base resin, the polypropylene base resin having
a weight average molecular weight Mw of 130,000 g/ml or lower as determined by GPC according to ISO 16014-4 2003;
lamellas of a thickness from 24.2 nm to 84.6 nm in an amount of at least 40% when measured by stepwise isothermal segregation technique (SIST); and
a molecular weight distribution broadness Mw/Mn as calculated from gel permeation chromatography according to ISO 16014-4 2003, of at least 5, and
the polypropylene composition having an MFR$_2$ measured according to ISO 1133 (230° C., 2.16 kg load) of at least 50 g/10 min; and
a tensile modulus of 2000 MPa or higher when measured according to ISO 527-2 using injection moulded test specimens T as described in EN ISO 1873-2 (dog bone shape, 4 mm thickness).

13. A composition of matter according to claim 12, wherein the filler is a fiber optionally selected from glass fibers and carbon fibers.

14. A composition of matter according to claim 12, wherein the filler is talc.

15. A composition according to claim 1 characterized by having increased temperature resistance.

* * * * *